March 29, 1932.                J. P. BUYNISKI                 1,851,661
                             PACKAGE FOR TAPE
                           Filed Dec. 13, 1930
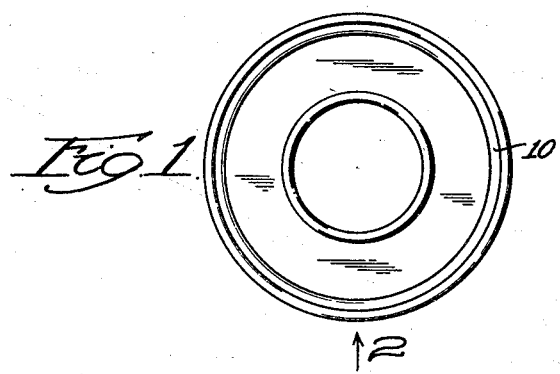
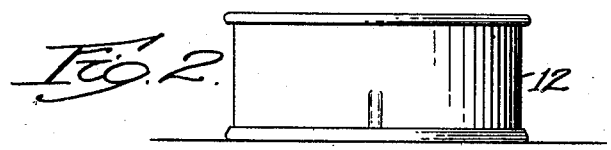
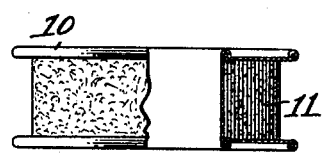
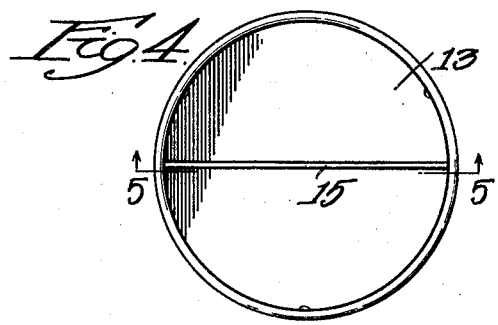
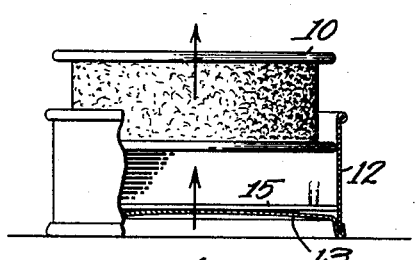
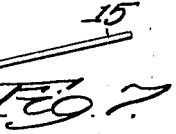
Inventor.
Joseph P. Buyniski Patented Mar. 29, 1932

1,851,661

UNITED STATES PATENT OFFICE

JOSEPH P. BUYNISKI, OF WORCESTER, MASSACHUSETTS

PACKAGE FOR TAPE

Application filed December 13, 1930. Serial No. 502,183.

This invention relates to a metal container for a metal spool on which tape is wound or the like. It relates particularly to packages of adhesive tape. Two kinds of packages of this kind are on the market in one of which both of the ends are open and in the other of which one is open and the other is closed. The closed end of the package is supposed to be flexible and capable of dislodging the spool by being moved inwardly but as a matter of fact it is not effective for this purpose.

The principal object of this invention is to provide means whereby the spool can be loosened easily and surely by the flexing of the closed end of the package.

Other objects and advantages of the invention will appear hereinafter.

Reference is to be had to the accompanying drawings, in which

Fig. 1 is a face view of a package constructed in accordance with this invention, showing the spool in place therein;

Fig. 2 is a side view thereof;

Fig. 3 is a similar view of the spool with one side in radial section;

Fig. 4 is a plan of the container with the spool removed showing the main feature of this invention;

Fig. 5 is a sectional view on the line 5—5 of Fig. 4;

Fig. 6 is a similar view showing the bottom snapped inwardly and the spool partly removed, and Fig. 7 is a perspective view of the rod across the bottom of the package.

This invention relates to spool packages for surgeons' tape or the like, the spool 10 being of the usual construction and comprising a central cylinder on which the tape 11 is wound and two parallel side flanges for containing the tape between them. The container in which this spool is dispensed and stored comprises a cylindrical wall 12 of tin or the like and a convex flexible bottom 13 secured to it in any usual way. This bottom 13 can be snapped from the position shown in Fig. 5 to that shown in Fig. 6. This is for the purpose of throwing out the spool 10 in accordance with previous inventions, but it has not worked efficiently.

My invention consists in providing a rod 15 located diametrically across the bottom. This rod preferably is held in place by making it just long enough so that it can be flexed slightly and forced against the sides of the cylindrical walls 12 so as to hold the rod in position, with some play.

The spool 10 rests on this rod and the flexing of the end wall 13 therefore will force the spool up out of the casing or package in which it is normally located. It will be understood, of course, that the spool and cylindrical wall 12 fit each other in such a way that when the parts are in the position shown in Fig. 5 the spool can be put into place and will remain there by friction. The walls 12 are slightly concave, either all around or at several points so that the convex edge of the flange of the spool 10 will have to be forced in and will not easily be detached except by the use of the means 15 for transmitting the motion of the end 13 to the spool.

Although I have illustrated and described only one form of the invention I am aware of the fact that modifications can be made therein by any person skilled in the art without departing from the scope of the invention as expressed in the claims. Therefore, I do not wish to be limited in this respect but what I do claim is:—

1. The combination with a metallic container and a spool in which tape or the like can be mounted adapted to fit in said container by friction, the container having a flexible metal convex end and loosely disposed means located between said end and the spool for transmitting a movement of the end to the spool to dislodge it.

2. The combination with a metallic cylindrical container open at one end and having one end consisting of a flexible sheet metal member normally convex and adapted to be flexed from one side of a medial plane to another and a spool or the like adapted to be held in the cylindrical wall of the container by friction, of a loosely disposed rod extending across said end whereby the center of the end when flexed inwardly will act through the rod to loosen the spool from the casing.

3. The combination with a metallic cylindrical container having an end consisting of a normally convex flexible sheet metal member adapted to be flexed from one side of a medial plane to another and a spool or the like adapted to be held in the cylindrical wall of the casing by friction, of a flexible rod extending diametrically across said end, whereby the center of the end when flexed inwardly wil push the rod against the spool and project the spool from the casing.

In testimony whereof I have hereunto affixed my signature.

JOSEPH P. BUYNISKI.